(12) United States Patent
Cho et al.

(10) Patent No.: US 11,398,780 B2
(45) Date of Patent: Jul. 26, 2022

(54) DC-DC CONVERTER PROVIDING MULTIPLE OPERATION MODES USING MULTI-MODE CONTROLLER

(71) Applicant: ELECTRONICS AND TELECOMMUNICATIONS RESEARCH INSTITUTE, Daejeon (KR)

(72) Inventors: Young Kyun Cho, Daejeon (KR); Heon Kook Kwon, Daejeon (KR); Kwang Seon Kim, Sejong-si (KR); Tae Joong Kim, Daejeon (KR); Kwangchun Lee, Daejeon (KR); Jung Nam Lee, Sejong-si (KR); Jae Ho Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 48 days.

(21) Appl. No.: 16/902,349

(22) Filed: Jun. 16, 2020

(65) Prior Publication Data
US 2021/0159794 A1    May 27, 2021

(30) Foreign Application Priority Data

Nov. 26, 2019    (KR) .................. 10-2019-0153086

(51) Int. Cl.
*H02M 3/158*    (2006.01)
*H02M 1/00*    (2006.01)
*H02M 3/157*    (2006.01)
*H02M 3/156*    (2006.01)

(52) U.S. Cl.
CPC ....... *H02M 3/1582* (2013.01); *H02M 1/0048* (2021.05); *H02M 3/157* (2013.01); *H02M 3/1566* (2021.05)

(58) Field of Classification Search
CPC .. H02M 3/1582; H02M 3/157; H02M 1/0048; H02M 1/0054
See application file for complete search history.

(56) References Cited

U.S. PATENT DOCUMENTS

| | | | |
|---|---|---|---|
| 7,015,678 | B2 | 3/2006 | Plankensteiner |
| 8,305,055 | B2 | 11/2012 | Wu et al. |
| 8,841,895 | B2 | 9/2014 | Prexl et al. |
| 8,896,279 | B2 | 11/2014 | Wu et al. |
| 8,937,472 | B2 | 1/2015 | Heo et al. |

(Continued)

FOREIGN PATENT DOCUMENTS

| | | |
|---|---|---|
| JP | 2015-503901 A | 2/2015 |
| KR | 10-2010-0041871 A | 4/2010 |

*Primary Examiner* — Gustavo A Rosario-Benitez
(74) *Attorney, Agent, or Firm* — LRK Patent Law Firm

(57) ABSTRACT

A direct current-to-direct current (DC-DC) converter providing multiple operation modes includes a buck power stage configured to lower an input voltage, a boost power stage configured to increase the input voltage, and a multi-mode controller configured to control the buck power stage and the boost power stage, wherein the multi-mode controller is configured to generate a signal to control the buck power stage and the boost power stage according to the input voltage and an output voltage, and control the buck power stage and the boost power stage using the signal.

9 Claims, 11 Drawing Sheets

(56) References Cited

U.S. PATENT DOCUMENTS

| | | | |
|---|---|---|---|
| 8,957,661 B2 | 2/2015 | Heo et al. | |
| 9,122,294 B2 | 9/2015 | Liu et al. | |
| 10,020,735 B2* | 7/2018 | Le Men | H02M 3/1582 |
| 10,038,382 B2 | 7/2018 | Houston et al. | |
| 10,254,314 B1* | 4/2019 | Li | G01R 19/003 |
| 10,505,448 B2 | 12/2019 | Cho et al. | |
| 10,819,232 B2* | 10/2020 | Suk | H02M 1/08 |
| 2010/0207455 A1* | 8/2010 | Erickson, Jr. | H02M 3/1582 307/82 |
| 2012/0274295 A1* | 11/2012 | Lin | H02M 3/1582 323/282 |
| 2014/0077870 A1* | 3/2014 | Liu | G05F 1/62 327/540 |
| 2015/0229215 A1* | 8/2015 | Choudhary | H02M 1/14 323/271 |
| 2015/0280559 A1 | 10/2015 | Vaidya et al. | |
| 2015/0303803 A1* | 10/2015 | Chen | H02M 3/158 323/271 |
| 2017/0040898 A1* | 2/2017 | Hong | H02M 3/1582 |
| 2017/0085224 A1* | 3/2017 | Youn | H03F 1/0227 |
| 2018/0358900 A1 | 12/2018 | Sun et al. | |
| 2019/0052173 A1* | 2/2019 | Shumkov | H02M 3/1582 |
| 2019/0173370 A1* | 6/2019 | Gong | G01R 19/0092 |
| 2021/0194356 A1* | 6/2021 | Afridi | H02J 9/062 |

* cited by examiner

DC-DC CONVERTER PROVIDING MULTIPLE OPERATION MODES USING MULTI-MODE CONTROLLER

CROSS-REFERENCE TO RELATED APPLICATION(S)

This application claims the benefit of Korean Patent Application No. 10-2019-0153086, filed on Nov. 26, 2019, in the Korean Intellectual Property Office, the disclosure of which is incorporated herein by reference.

BACKGROUND

1. Field of the Invention

One or more example embodiments relate to a direct current-to-direct current (DC-DC) conversion device providing multiple operation modes, and more particularly, to a DC-DC converter providing multiple operation modes using a multi-mode controller.

2. Description of Related Art

Recently, portable electronic devices require functions for small size, light weight, and long usage time. This trend makes a direct current-to-direct current (DC-DC) converter essential to a portable electronic device. The DC-DC converter is used as a buck converter, a boost converter, or a buck-boost converter depending on a relationship between an input voltage and an output voltage.

The buck-boost converter has both the function of the buck converter and the function of the boost converter and thus, may replace the buck converter and the boost converter. However, the efficiency of the buck-boost converter may be lower than that when the buck converter or the boost converter is used independently. In addition, independent controllers are required respectively to support both the function of the buck converter and the function of the boost converter.

SUMMARY

An aspect may independently use a buck converter, a boost converter, and a buck-boost converter by adding a switch and a controller to the buck-boost converter. Further, the aspect may obtain a high conversion efficiency due to a characteristic of conduction loss lower than that of an existing converter through the added switch.

Another aspect may control three operation modes through a single multi-mode controller and thus, requires no additional controller and requires no complex algorithm to change an operation mode, thereby efficiently providing multiple operation modes.

According to an aspect, there is provided a direct current-to-direct current (DC-DC) converter including a buck power stage configured to lower an input voltage, a boost power stage configured to increase the input voltage, and a multi-mode controller configured to control the buck power stage and the boost power stage.

The multi-mode controller may be configured to generate a signal to control the buck power stage and the boost power stage according to the input voltage and an output voltage, and control the buck power stage and the boost power stage using the signal.

The buck power stage may include a buck switch configured to operate to lower the input voltage by receiving the signal from the multi-mode controller, and in case of increasing the input voltage, further include a first auxiliary switch arranged along with the buck switch to lower a resistance of the buck power stage.

The boost power stage may include a boost switch configured to operate to increase the input voltage by receiving the signal from the multi-mode controller, and in case of lowering the input voltage, further include a second auxiliary switch arranged along with the boost switch to lower a resistance of the boost power stage.

The multi-mode controller may include a single-bit controller configured to output a signal including a single bit according to the input voltage.

The multi-mode controller may include a duo-binary encoder, and the duo-binary encoder may be configured to perform duo-binary encoding on the signal output from the single-bit controller, and control the buck power stage and the boost power stage using the encoded signal.

The multi-mode controller may include an independent mode selector configured to generate a signal needed when the DC-DC converter operates in a buck mode or a boost mode.

The duo-binary encoder may be configured to control the buck power stage or the boost power stage such that the DC-DC converter operates in one of a buck mode, a boost mode, and a buck-boost mode.

The duo-binary encoder may be configured to control the buck power stage or the boost power stage such that the DC-DC converter operates in a buck mode, if the input voltage is higher than a first reference voltage, control the buck power stage or the boost power stage such that the DC-DC converter operates in a boost mode, if the input voltage is lower than a second reference voltage, and control the buck power stage or the boost power stage such that the DC-DC converter operates in a buck-boost mode, if the input voltage is between the first reference voltage and the second reference voltage, wherein the first reference voltage may be higher than the second reference voltage.

According to another aspect, there is provided a method of converting a voltage, the method including receiving an input voltage, generating a single bit according to the input voltage, performing duo-binary encoding on the single bit, determining an operation mode to operate a DC-DC converter among a buck mode, a boost mode, and a buck-boost mode using the encoded single bit, and converting the input voltage by controlling the DC-DC converter according to the determined operation mode.

According to example embodiments, it is possible to independently use a buck converter, a boost converter, and a buck-boost converter by adding a switch and controller to the buck-boost converter. Further, it is possible to obtain a high conversion efficiency due to a characteristic of conduction loss lower than that of an existing converter through the added switch.

According to example embodiments, it is possible to control three operation modes through a single multi-mode controller and thus, requires no additional controller and requires no complex algorithm to change an operation mode, thereby efficiently providing multiple operation modes.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION OF THE INVENTION

Figure 1:
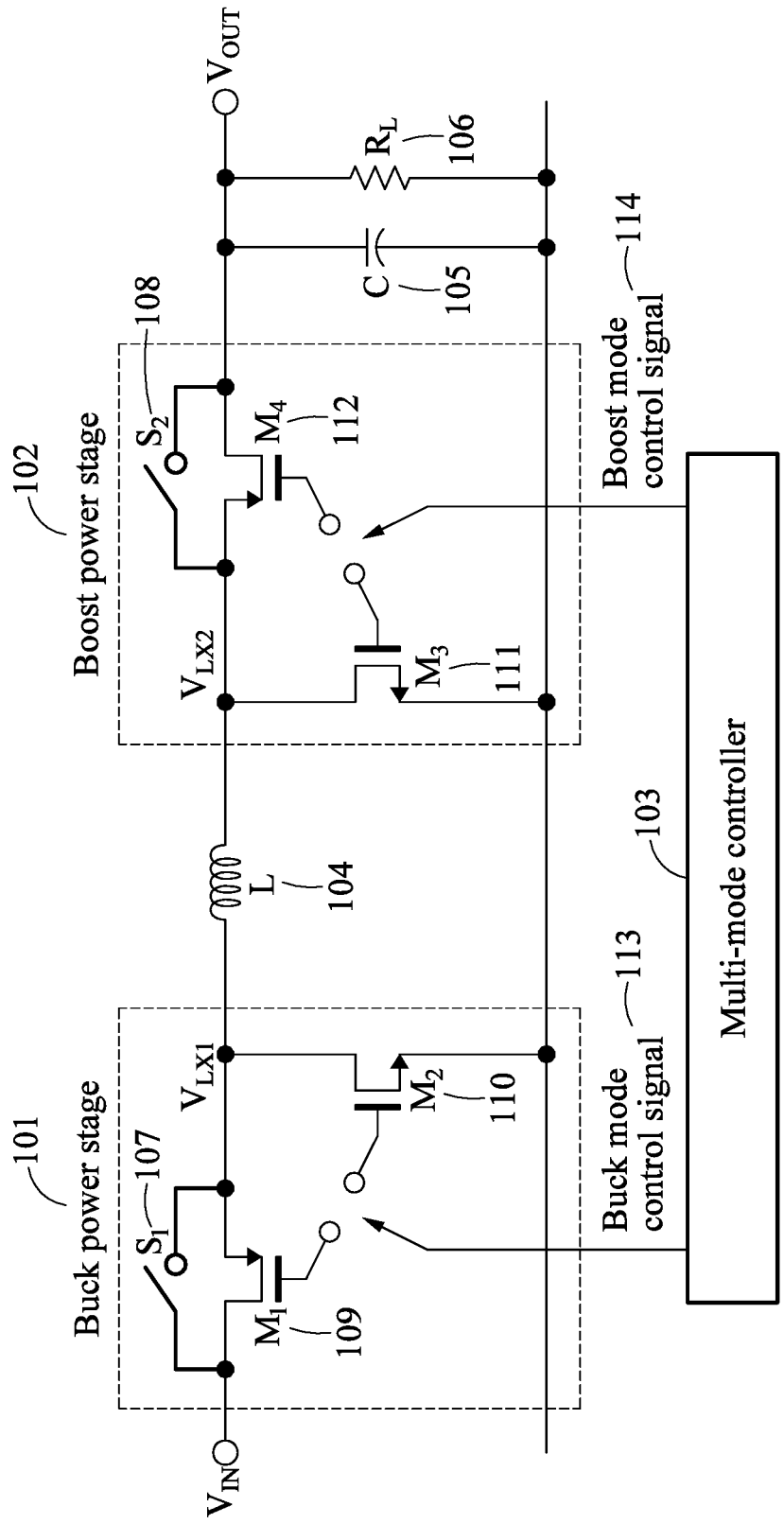
FIG. 1 illustrates a structure of a direct current-to-direct current (DC-DC) converter according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 illustrates a structure of a direct current-to-direct current (DC-DC) converter according to an example embodiment.

Referring to FIG. 1, a DC-DC converter includes a buck power stage 101, a boost power stage 102, and a multi-mode controller 103. The DC-DC converter further includes a capacitor 105, a load resistor 106, and an inductor 104.

The buck power stage 101 includes switches 109 and 110 to perform a buck mode operation. The buck power stage 101 further includes an additional switch 107 to increase the conversion efficiency by reducing the resistance of the DC-DC converter.

The boost power stage 102 includes switches 111 and 112 to perform a boost mode operation. Similar to the buck power stage 101, the boost power stage 102 further includes an additional switch 108 to increase the conversion efficiency by reducing the resistance of the DC-DC converter.

The additional switches 107 and 108 may be configured as NMOS transistors, PMOS transistors, or CMOS transistors that use NMOS transistors and PMOS transistors at the same time. In particular, if the additional switches 107 and 108 are configured as NMOS transistors, the small area thereof may reduce the resistance of the DC-DC converter and reduce the chip size.

The DC-DC converter controls the switches 107 to 112 according to control signals 113 and 114 of the multi-mode controller 103. Further, the DC-DC converter may operate in a buck mode, a boost mode, or a buck-boost mode through the multi-mode controller 103. By controlling multiple operation modes through a single controller, it is possible to efficiently convert an input voltage into a constant output voltage even when the input voltage is variable.

Since the DC-DC converter may operate in three modes through a single controller, there are no dead zones that occur when multiple controllers are used. Further, the DC-DC converter does not require a complex algorithm having a great power consumption to reduce dead zones.

In detail, if the multi-mode controller 103 determines an operation mode to be the buck mode according to an input voltage and an output voltage, the multi-mode controller 103 controls the switches 109 and 110 in the buck power stage 101, through the buck mode control signal 113.

The multi-mode controller 103 controls the switch 112 of the boost power stage 102 to operate and the switch 111 of the boost power stage 102 not to operate through the boost mode control signal 114. Further, the multi-mode controller 103 controls the additional switch 107 not to operate and turns on the additional switch 108, thereby lowering the resistance between the inductor 104 and the output voltage and reducing the conduction loss.

If the operation mode is determined to be the boost mode, the multi-mode controller 103 controls the switches 111 and 112 of the boost power stage 102 through the control signal 114. Further, the multi-mode controller 103 controls the switch 109 of the buck power stage 101 to operate and the switch 110 not to operate through the buck mode control signal 113.

The multi-mode controller 103 controls the additional switch 108 not to operate and the additional switch 107 to operate, thereby reducing the conduction loss between the input voltage and the inductor 104 in the boost mode.

In the buck-boost mode, the multi-mode controller 103 controls both the additional switches 107 and 108 not to operate, and controls the switch 109 of the buck power stage 101 and the switch 112 of the boost power stage 102 to operate in synchronization with the additional switches 107 and 108 to prevent a conduction loss.

In an example, if the load current is great, an effect of a loss caused by switching of the operation mode is not great. Thus, the multi-mode controller 103 controls the additional switches 107 and 108 to operate in synchronization with the switches 109 and 112, respectively. If the load current is small, the multi-mode controller 103 controls the additional switches 107 and 108 not to operate.

Figure 2:
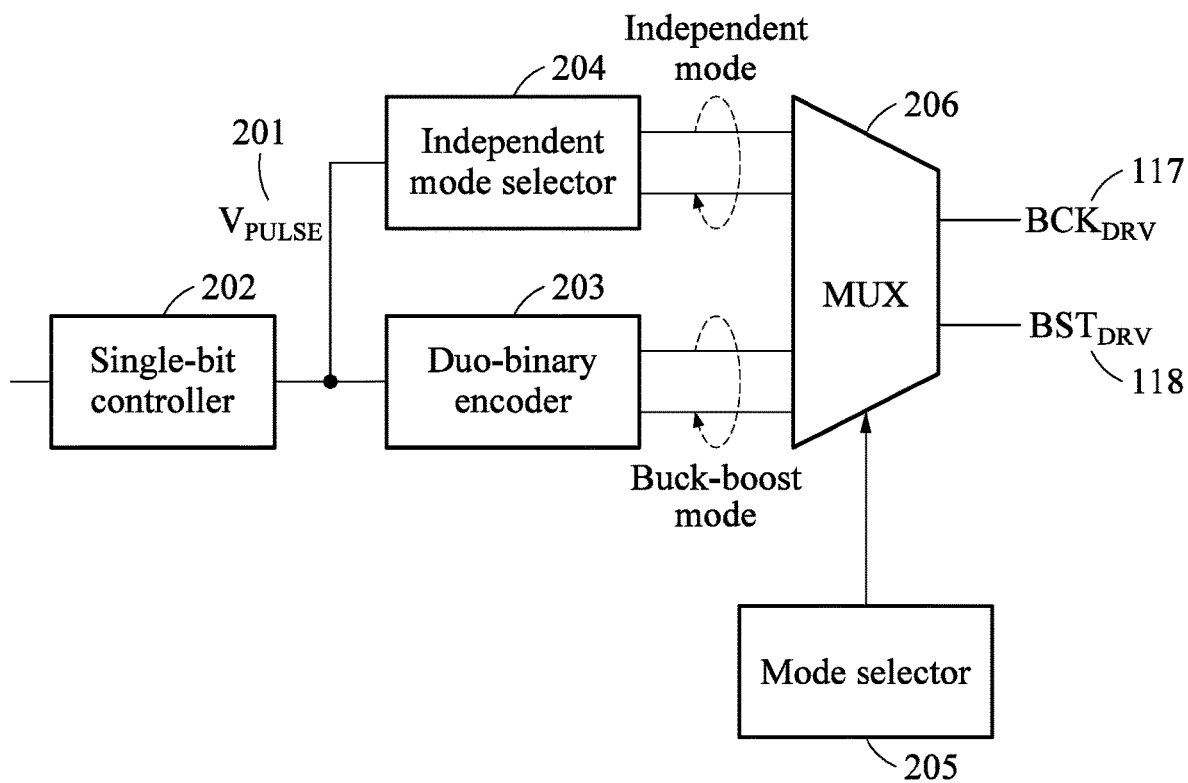
FIG. 2 illustrates a structure of a multi-mode controller according to an example embodiment.

FIG. 2 illustrates a structure of a multi-mode controller according to an example embodiment.

The multi-mode controller 103 includes a single-bit controller 202, an independent mode selector 204, and a duo-binary encoder 203. In addition, the multi-mode controller 103 includes a MUX circuit 206 to combine signals output from the independent mode selector 204 and the duo-binary encoder 203, and a mode selector 205 to determine whether to perform an individual mode (buck mode or boost mode) operation or perform a duo-binary mode operation, using a combined signal.

If the input and output voltages are determined clearly, it is proper to operate the DC-DC converter using the output of the independent mode selector 204. If a mode to operate the DC-DC converter is unknown since the input and output voltages are not defined clearly, it is proper to operate the DC-DC converter using the duo-binary encoder 203.

Figure 3:
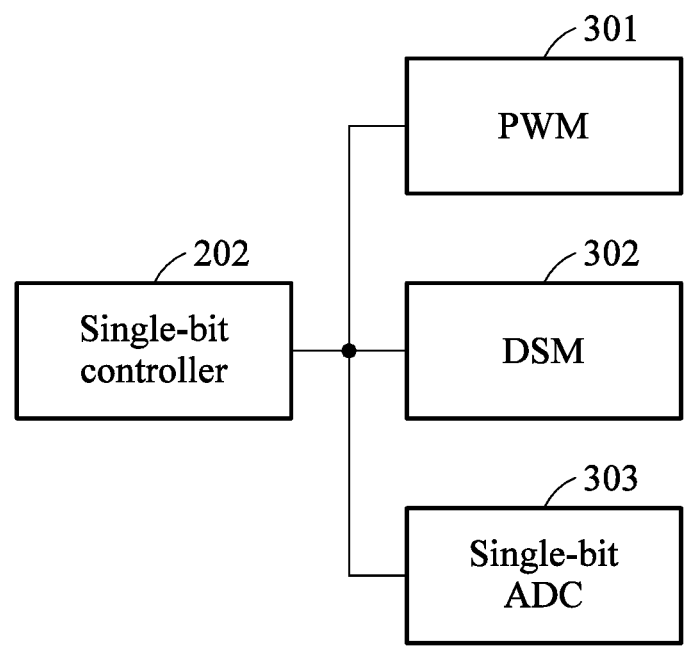
FIG. 3 illustrates a configuration of a single-bit controller according to an example embodiment.

FIG. 3 illustrates a configuration of a single-bit controller according to an example embodiment.

The single-bit controller 202 may be configured as one of a pulse-width modulator (PWM) 301, a delta-sigma modulator (DSM) 302, and a single-bit analog-to-digital converter (ADC) 303. The single-bit controller 202 may be configured as multiple types of 1-bit controllers.

Further, the single-bit controller 202 outputs a pulse signal 201 to the duo-binary encoder 203 and the independent mode selector 204 generating a signal related to the operation mode by receiving an input from a loop compensator.

Figure 4:
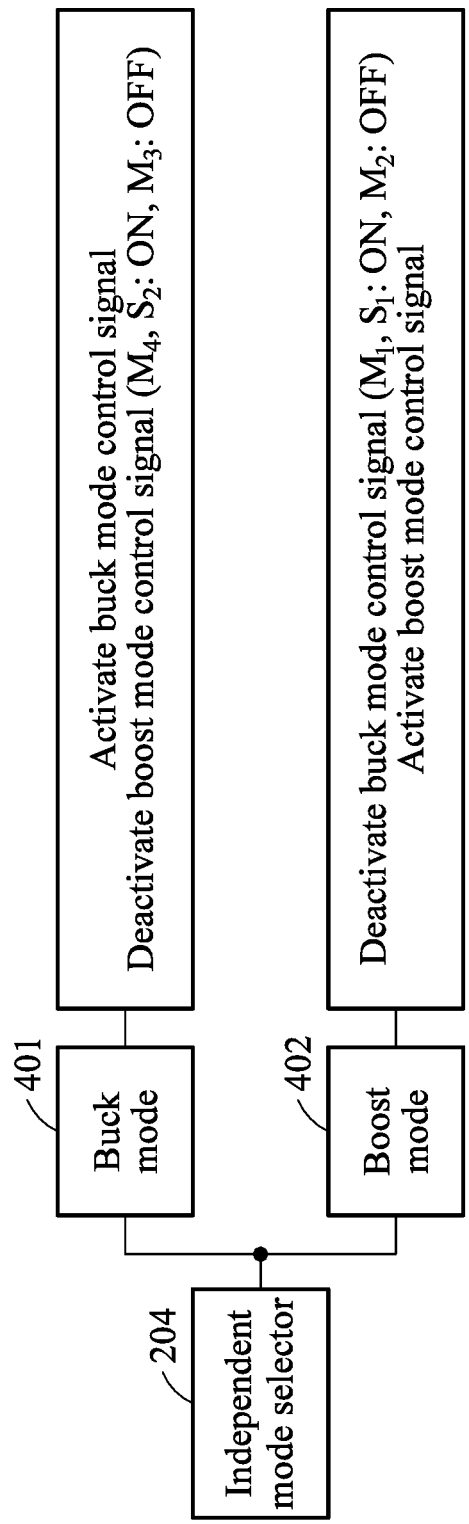
FIG. 4 illustrates an operating method of an independent mode selector according to an example embodiment.

FIG. 4 illustrates an operating method of an independent mode selector according to an example embodiment.

The independent mode selector 204 generates a pulse signal required for a buck mode operation and a boost mode operation. If the DC-DC converter operates in a buck mode 401, the multi-mode controller 103 activates only the buck mode control signal 113 transmitted to the buck power stage 101.

Further, the multi-mode controller 103 deactivates the boost mode control signal 114 to control the switch 112 of the boost power stage 102 and the additional switch 108 to operate all the time and the switch 111 not to operate all the time.

In detail, if the output voltage is higher than a desired voltage, the single-bit controller 202 outputs the pulse signal by increasing the frequency of a high pulse compared to a low pulse, and the independent mode selector 204 receives the output pulse signal and controls the switch 110 of the buck power stage 101 to be turned on relatively long through the buck mode control signal 113, thereby lowering the output voltage.

Conversely, if the output voltage is lower than the desired voltage, the single-bit controller 202 outputs the pulse signal by increasing the frequency of a low pulse. The independent mode selector 204 receives the output pulse signal and controls the switch 109 of the buck power stage 101 to continuously operate, through the buck mode control signal 113, thereby increasing the output voltage.

If the DC-DC converter operates in a boost mode 402, the multi-mode controller 103 activates only the boost mode control signal 114 transmitted to the boost power stage 102. The multi-mode controller 103 deactivates the buck mode control signal 113 to control the switch 109 of the buck power stage 101 and the additional switch 107 to operate all the time and the switch 110 not to operate all the time.

The boost mode control signal 114 may be implemented to have an opposite phase to the output signal of the single-bit controller 202. If the output voltage is higher than the desired voltage, the single-bit controller 202 outputs the pulse signal by increasing the frequency of a high pulse signal compared to a low pulse signal. The independent mode selector 204 receives the output pulse signal and controls the switch 112 of the boost power stage 102 to continuously operate, through the boost mode control signal 114, thereby adjusting the output voltage to the desired voltage.

Conversely, if the output voltage is lower than the desired voltage, the single-bit controller 202 outputs the pulse signal by increasing the frequency of a low pulse signal. The independent mode selector 204 receives the output pulse signal and controls the switch 111 of the boost power stage 102 to continuously operate, through the boost mode control signal 114, thereby adjusting the output voltage to the desired voltage.

To operate the DC-DC converter in a buck-boost mode, the duo-binary encoder 203 needs to control the switches using the encoded signal of the single-bit controller 202.

Figure 5:
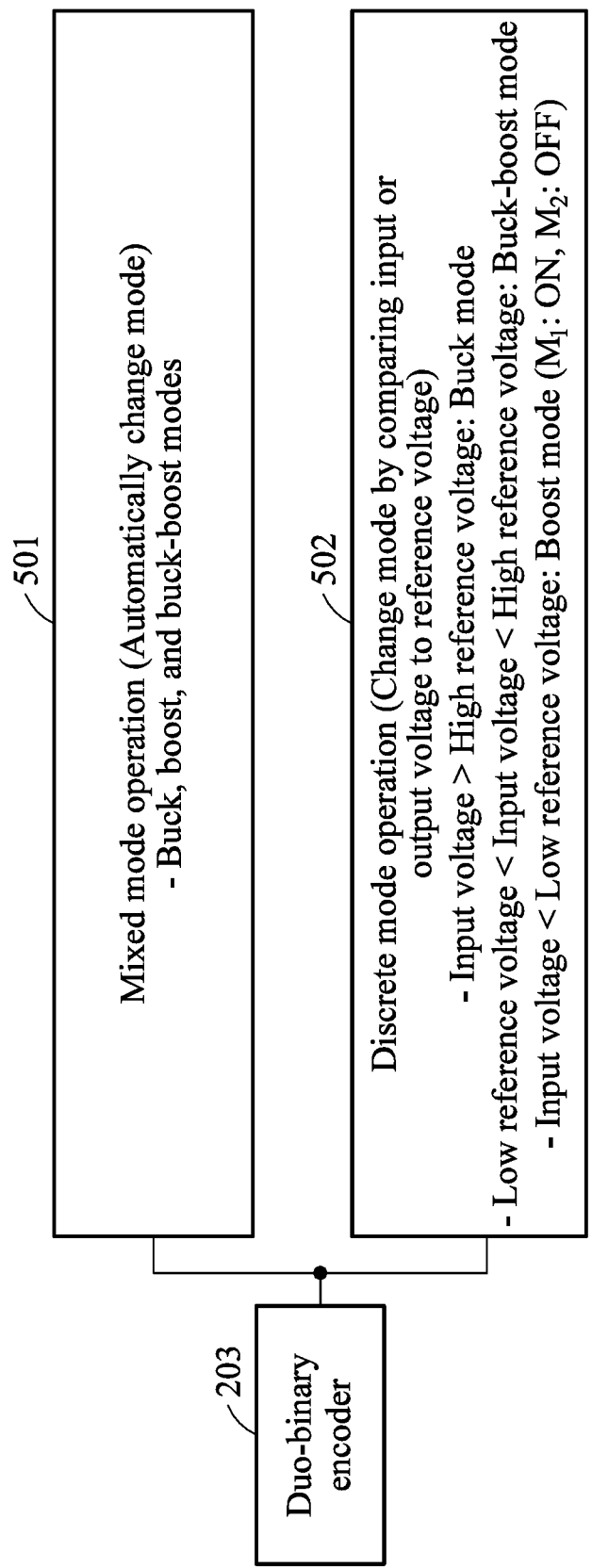
FIG. 5 illustrates an operating method of a duo-binary encoder according to an example embodiment.

FIG. 5 illustrates an operating method of a duo-binary encoder according to an example embodiment.

The duo-binary encoder 203 has two operation modes.

First, a mixed mode 501 uses an operation mode by mixing a buck mode, a boost mode, and a buck-boost mode, and performs conversion while automatically changing the mode.

The duo-binary encoder 203 performs duo-binary encoding on the pulse signal of the single-bit controller 202. In detail, the encoding is performed using a sum of a single-bit output and a delayed single-bit output ($V_{DUO}=V_{PULSE}+V_{PULSE+1}$). The duo-binary encoded pulse signal of the single-bit controller 202 has signals of "0", "1", and "2".

The signals of "0", "1", and "2" respectively correspond to a charging operation, a bypassing operation, and a discharging operation through the duo-binary encoder 203. If the switches of the DC-DC converter are controlled in the mixed mode 501, the magnitude of current flowing in the inductor 104 may be reduced, whereby it is possible to improve a conduction loss and a switching loss.

For example, if the single bit controller 202 includes a DSM, a control scheme to which duo-binary encoding is applied automatically determines switching among the buck, buck-boost, and boost modes by an output bitstream of the DSM. For this reason, no dead zones occur, and thus the DC-DC converter does not require a complex algorithm or a reference circuit for mode switching.

If the DC-DC converter operates in the mixed mode 501, the additional switches 107 and 108 added for operation in an individual mode (the buck mode or the boost mode) may be controlled not to operate, or to operate in synchronization with the switch 109 of the buck power stage 101 and the switch 112 of the boost power stage 102 for additional reduction of the conduction loss.

In the mixed mode 501, the boundary among the buck mode, the boost mode, and the buck-boost mode is unclear. For this reason, in case of requiring a clear distinction of the operation mode, each mode may be distinguished by adding a reference voltage to distinguish a boundary of each mode through a discrete mode 502.

Figure 6A:
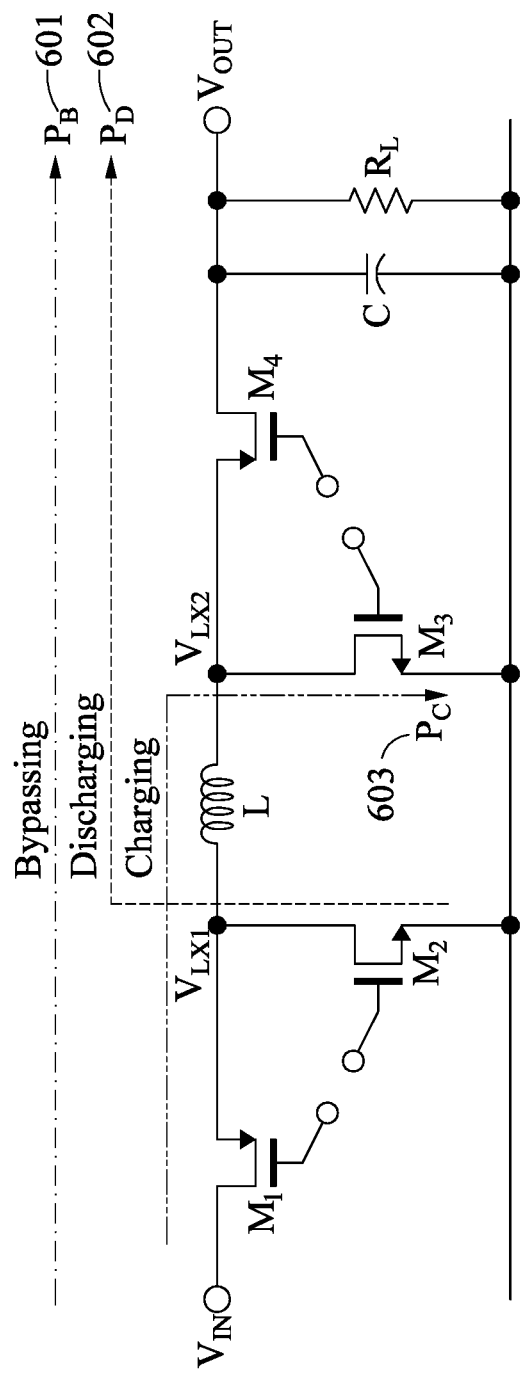
FIGS. 6A and 6B illustrate an example of controlling a switch through a duo-binary encoder according to an example embodiment.
Figure 6B:
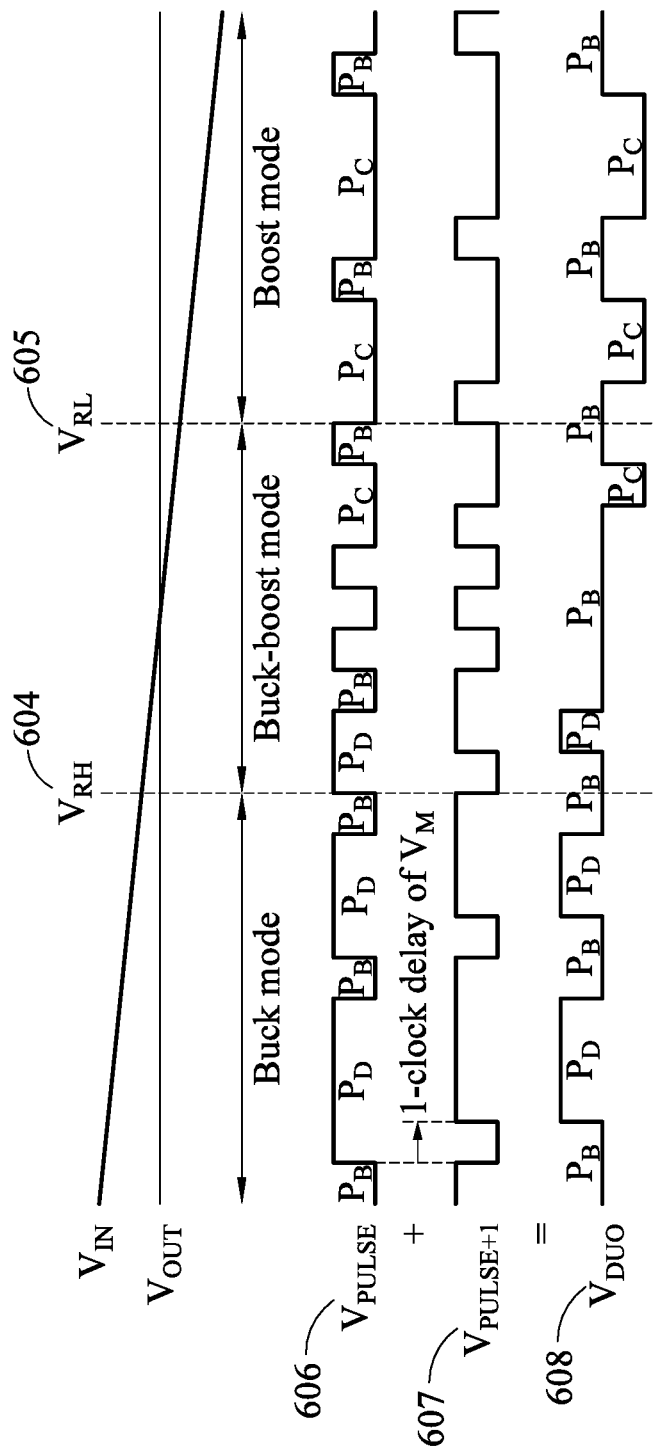

FIGS. 6A and 6B illustrate an example of controlling a switch through a duo-binary encoder according to an example embodiment.

FIG. 6A illustrates a process of performing charging, bypassing, and discharging operations in the DC-DC converter through the duo-binary encoder 203 of the multimode controller 103.

FIG. 6B illustrates a change in the operation mode according to an input voltage and a reference voltage in the discrete mode 502. Further, the graphs show examples of determining charging, bypassing, and discharging operations according to a pulse signal 606 from the single-bit controller 202, a delayed pulse signal 607, and a signal 608 generated by the duo-binary encoder 203 through duo-binary encoding.

The discrete mode 502 determines an operation mode by comparing an input voltage to a reference voltage. That is, if the input voltage is higher than a high reference voltage 604, the DC-DC converter operates only in the buck mode. If the input voltage is lower than a low reference voltage 605, the DC-DC converter operates only in the boost mode. If the input voltage is between the high reference voltage 604 and the low reference voltage 605, the DC-DC converter operates in the buck-boost mode. Thus, the modes are not mixed.

When the DC-DC converter operates in the mixed mode 501, a charging operation 603 may occur even in the buck mode. However, when the DC-DC converter operates in the discrete mode 502, the duo-binary encoder 203 forces a bypassing operation 601 even when the charging operation 603 occurs. Further, if the input voltage is greater than the high reference voltage 604, the duo-binary encoder 203 performs only a discharging operation 602 and the bypassing operation 601.

Further, if the DC-DC converter operates in the boost mode, the duo-binary encoder 203 changes the discharging operation 602 to the bypassing operation 601 even when the discharging operation 602 occurs, such that only a pure boost operation may be performed.

If a clear operation distinction is performed, an additional switching operation in the buck or boost mode operation (for example, a charging operation in the buck mode or a discharging operation in the boost mode) does not need to be performed. Thus, a switching loss occurring when the operation mode is changed may be reduced. Further, since it is possible to know how the DC-DC converter operates in a predetermined operation mode, the DC-DC converter may be utilized in system applications.

If the input voltage is between the high reference voltage 604 and the low reference voltage 605 when the DC-DC converter operates in the discrete mode 502, the DC-DC converter may operate in the buck mode, the boost mode, and the buck-boost mode being mixed.

Figure 7A:
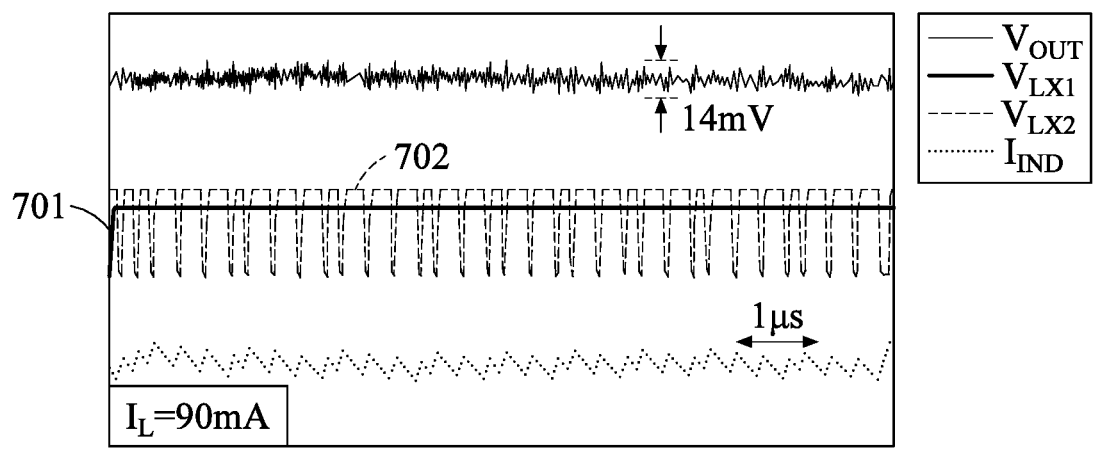
FIGS. 7A through 7C are voltage graphs shown when a switch is controlled by a duo-binary encoder according to an example embodiment.
Figure 7B:
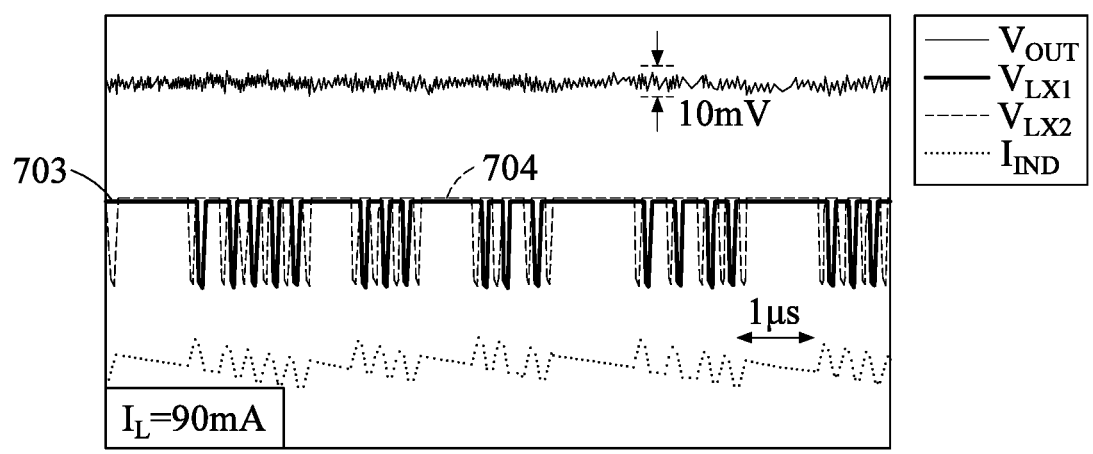
Figure 7C:
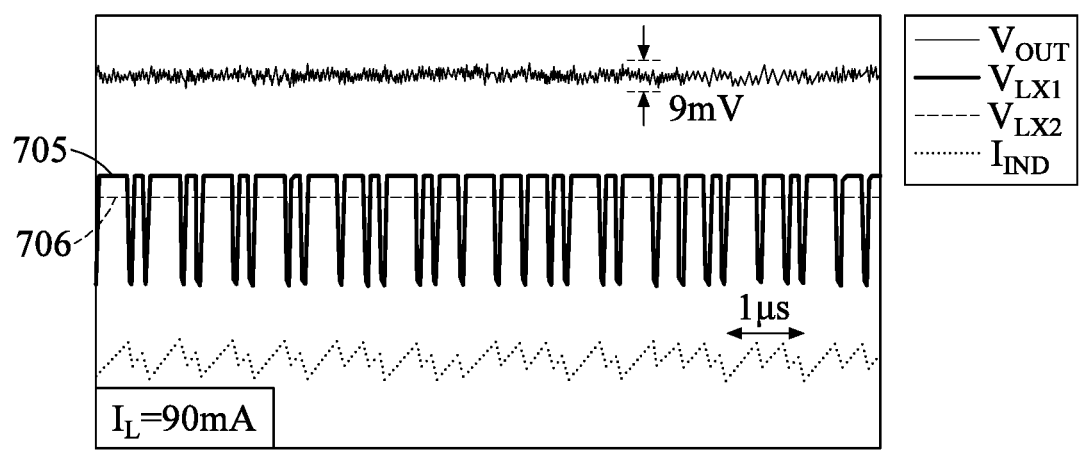

FIGS. 7A through 7C are voltage graphs shown when a switch is controlled by a duo-binary encoder according to an example embodiment.

FIGS. 7A through 7C illustrate voltage changes if the switches are controlled by the discrete mode 502, among the operation modes of the duo-binary encoder 203. According to a comparison between a reference voltage and an input voltage, FIG. 7A illustrates a voltage change during an operation in a boost mode.

If the DC-DC converter operates in the boost mode, only the switch 109 of the buck power stage 101 operates in response to the buck mode control signal being deactivated. Thus, a voltage 701 denotes a constant value, and a voltage 702 is switched by the boost mode control signal 114. Further, as shown in FIG. 7A, only a charging operation and a bypassing operation exist.

FIG. 7B illustrates an example of an operation in a buck-boost mode according to a comparison of a reference voltage and an input voltage. Since both the buck mode control signal 113 and the boost mode control signal 114 are activated, both voltages 703 and 704 are switched.

FIG. 7C illustrates an example of an operation in a buck mode according to a comparison of a reference voltage and an input voltage. Since the boost mode control signal 114 is deactivated, a voltage 706 denotes a constant value, and a voltage 705 is switched by the buck mode control signal 113. Further, only a discharging operation and a bypassing operation are performed.

Figure 8:
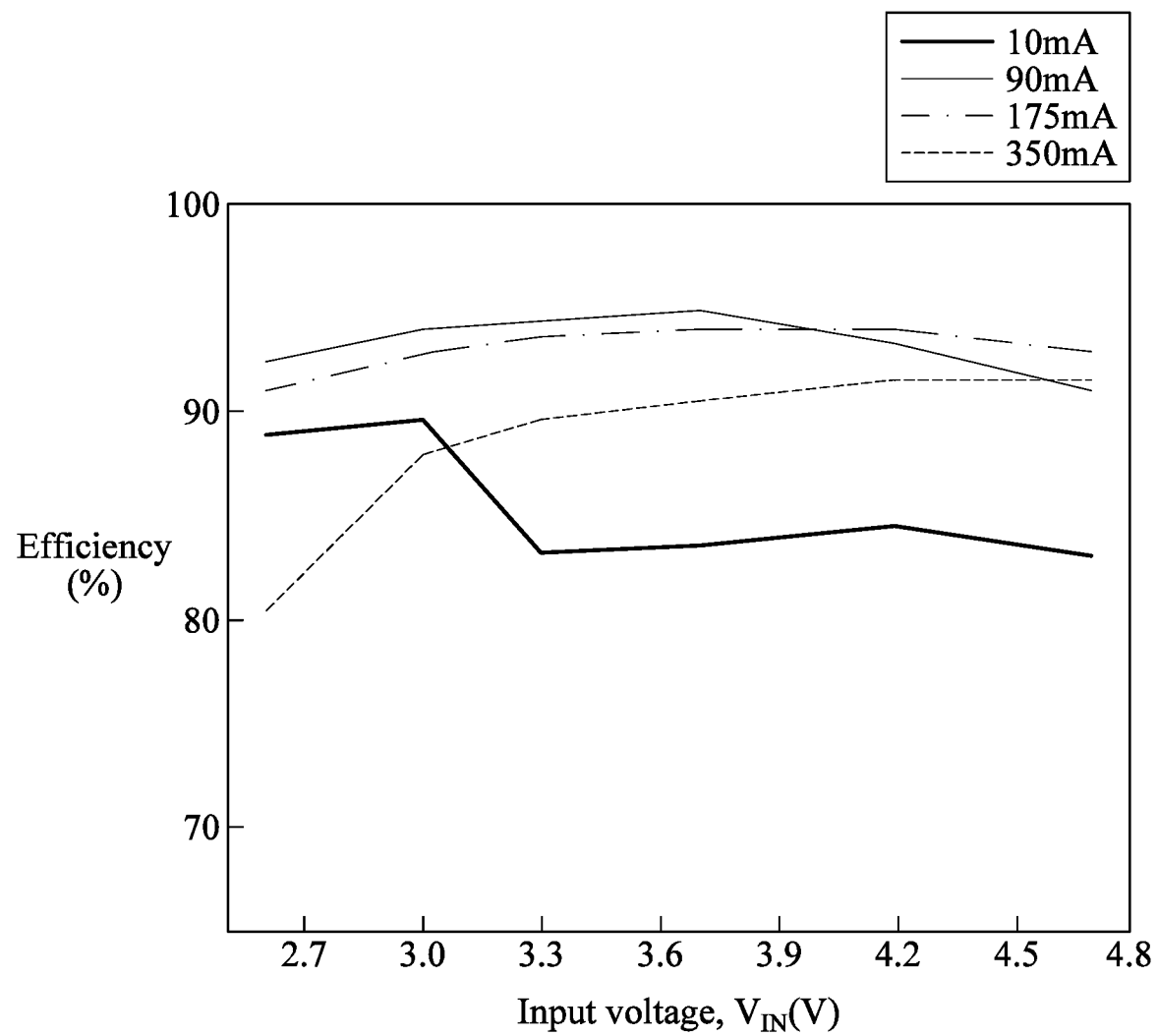
FIG. 8 is a graph illustrating a conversion efficiency of a DC-DC converter according to an example embodiment.

FIG. 8 is a graph illustrating a conversion efficiency of a DC-DC converter according to an example embodiment.

In FIG. 8, the conversion efficiency of the DC-DC converter when operating in the discrete mode 502 of the duo-binary encoder 203 is shown. Through the clear mode distinction, the DC-DC converter exhibits an efficiency of 80% or higher in all the operation modes.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

Although the specification includes the details of a plurality of specific implementations, it should not be understood that they are restricted with respect to the scope of any invention or claimable matter. On the contrary, they should be understood as the description about features that may be specific to the specific example embodiment of a specific invention. Specific features that are described in this specification in the context of respective example embodiments may be implemented by being combined in a single example embodiment. On the other hand, the various features described in the context of the single example embodiment may also be implemented in a plurality of example embodiments, individually or in any suitable sub-combination. Furthermore, the features operate in a specific combination and may be described as being claimed. However, one or more features from the claimed combination may be excluded from the combination in some cases. The claimed combination may be changed to sub-combinations or the modifications of sub-combinations.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous. Moreover, the separation of the various device components of the above-described example embodiments should not be understood as requiring such the separation in all example embodiments, and it should be understood that the described program components and devices may generally be integrated together into a single software product or may be packaged into multiple software products.

In the meantime, example embodiments of the present invention disclosed in the specification and drawings are simply the presented specific example to help understand an example embodiment of the present invention and not intended to limit the scopes of example embodiments of the present invention. It is obvious to those skilled in the art that other modifications based on the technical idea of the present invention may be performed in addition to the example embodiments disclosed herein.

What is claimed is:

1. A direct current-to-direct current (DC-DC) converter comprising:
 a buck power stage configured to lower an input voltage;
 a boost power stage configured to increase the input voltage; and
 a multi-mode controller configured to control the buck power stage and the boost power stage,
 wherein the multi-mode controller is configured to generate a control signal to control the buck power stage and the boost power stage according to the input voltage and an output voltage, and control the buck power stage and the boost power stage using the control signal,
 wherein the multi-mode controller is configured to generate a single-bit signal according to the input voltage, perform duo-binary encoding on the single-bit signal, and determine a buck mode, a boost mode, or a buck-boost mode using the duo-binary encoded signal,
 wherein the buck power stage comprises a first set of buck switches configured to operate to lower the input voltage by receiving the control signal from the multi-mode controller, and in case of increasing the input voltage, further comprises a first auxiliary switch arranged along with one of the buck switches to lower a resistance of the buck power stage,
 wherein the boost power stage comprises a second set of boost switches configured to operate to increase the input voltage by receiving the control signal from the multi-mode controller, and in case of lowering the input voltage, further comprises a second auxiliary switch arranged along with one of the boost switches to lower a resistance of the boost power stage,
 wherein when the DC-DC converter is operated in the buck mode using the first set of buck switches, the multi-mode controller controls the control signal such that the one of the boost switches is operated while another of the boost switches is not operated, whereas when the DC-DC converter is operated in the boost mode using the second set of boost switches, the multi-mode controller controls the control signal such that the one of the buck switches is operated while another of the buck switches is not operated.

2. The DC-DC converter of claim 1, wherein when the DC-DC converter is operated in the buck mode, the multi-mode controller controls such that the first auxiliary switch is turned off and the second auxiliary switch is turned on.

3. The DC-DC converter of claim 1, wherein when the DC-DC converter is operated in the boost mode, the multi-mode controller controls such that the first auxiliary switch is turned on and the second auxiliary switch is turned off.

4. The DC-DC converter of claim 1, wherein the multi-mode controller comprises a single-bit controller configured to output the single-bit signal according to the input voltage.

5. The DC-DC converter of claim 4,
 wherein the multi-mode controller comprises a duo-binary encoder configured to perform the duo-binary encoding on the single-bit signal output from the single-bit controller, and to control the buck power stage and the boost power stage using the duo-binary encoded signal.

6. The DC-DC converter of claim 1, wherein the multi-mode controller comprises an independent mode selector configured to generate a signal needed when the DC-DC converter operates in the buck mode or the boost mode.

7. The DC-DC converter of claim 5, wherein the duo-binary encoder is configured to control the buck power stage or the boost power stage to select one mode from among the buck mode, the boost mode, and a buck-boost mode such that the DC-DC converter operates in the selected one of the buck mode, the boost mode, and the buck-boost mode.

8. The DC-DC converter of claim 5, wherein the duo-binary encoder is configured to:
 control the buck power stage or the boost power stage such that the DC-DC converter operates in the buck mode, if the input voltage is higher than a first reference voltage,
 control the buck power stage or the boost power stage such that the DC-DC converter operates in the boost mode, if the input voltage is lower than a second reference voltage, and
 control the buck power stage or the boost power stage such that the DC-DC converter operates in the buck-boost mode, if the input voltage is between the first reference voltage and the second reference voltage,
 wherein the first reference voltage is higher than the second reference voltage.

9. A method of converting a voltage, the method comprising:
 receiving an input voltage;
 generating a single bit according to the input voltage;
 performing duo-binary encoding on the single bit;
 determining an operation mode to operate a direct current-to-direct current (DC-DC) converter among a buck mode, a boost mode, and a buck-boost mode using the duo-binary encoded single bit; and
 converting the input voltage by controlling the DC-DC converter according to the determined operation mode,
 wherein the buck mode is configured such that a first set of buck switches of a buck power stage is operated to lower the input voltage by receiving a control signal from a multi-mode controller, and such that a first auxiliary switch arranged along with one of the buck switches is further operated to lower a resistance of the buck power stage in case of increasing the input voltage,
 wherein the boost mode is configured such that a second set of boost switches of a boost power stage is operated to increase the input voltage by receiving the control signal from the multi-mode controller, and such that a second auxiliary switch arranged along with one of the boost switches is further operated to lower a resistance of the boost power stage in case of lowering the input voltage,
 wherein in the buck mode, the one of the boost switches is controlled to be operated while another of the boost switches is controlled to be not operated, whereas in the boost mode, the one of the buck switches is controlled to be operated while another of the buck switches is controlled to be not operated.

* * * * *